United States Patent
Minamikawa

(10) Patent No.: US 7,712,648 B2
(45) Date of Patent: May 11, 2010

(54) THERMOWELDING APPARATUS AND METHOD FOR MANUFACTURING BATTERY MODULE

(75) Inventor: Masahito Minamikawa, Nissin (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 173 days.

(21) Appl. No.: 11/789,802

(22) Filed: Apr. 24, 2007

(65) Prior Publication Data

US 2008/0035704 A1   Feb. 14, 2008

(30) Foreign Application Priority Data

Apr. 26, 2006   (JP)   .............................. 2006-122501

(51) Int. Cl.
*B23K 31/02* (2006.01)
*H01M 6/02* (2006.01)
(52) U.S. Cl. .................. 228/58; 29/623.1; 136/252; 429/36
(58) Field of Classification Search .................. 228/901, 228/58; 29/623.1; 136/252; 429/36
See application file for complete search history.

(56) References Cited

U.S. PATENT DOCUMENTS

| 1,614,938 | A | * | 1/1927 | Wiegand | ..................... 338/238 |
| 4,808,490 | A | * | 2/1989 | Tsukuda et al. | ............. 428/699 |

FOREIGN PATENT DOCUMENTS

WO   WO 2006013743 A1 *   2/2006

* cited by examiner

*Primary Examiner*—Jessica L. Ward
*Assistant Examiner*—Devang Patel
(74) *Attorney, Agent, or Firm*—Christensen O'Connor Johnson Kindness PLLC

(57) ABSTRACT

An apparatus for performing thermowelding of, e.g., a battery module or the like. The surface of a heater of a thermowelding apparatus is subjected to surface treatment through coating of Teflon, fluoroplastics, or the like. Moreover, both side surfaces of the heater are folded. Surface treatment of the heater obviates thermowelding involving interposition of a Teflon tape, thereby improving a working efficiency. Folding both side surfaces of the heater prevents occurrence of warpage, which would otherwise arise during heating, whereby durability of the heater is also enhanced.

1 Claim, 5 Drawing Sheets

THERMOWELDING APPARATUS AND METHOD FOR MANUFACTURING BATTERY MODULE

PRIORITY INFORMATION

This application claims priority to Japanese Patent Application No. 2006-122501 filed on Apr. 26, 2006, which is incorporated herein by reference in its entirety.

BACKGROUND OF THE INVENTION

1. Technical Field

The present invention relates to thermowelding, and more particularly to a technique for thermally welding edges of a battery module.

2. Related Art

A battery stack to be disposed in a vehicle is constructed by means of arranging (stacking) a plurality of battery modules—which are formed from nickel-metal hydride batteries of one type or from a plurality of cells—in parallel to each other with cooling passages laid among the battery modules; assembling the battery modules by means of constraining edge members placed at the two ends of the modules; and electrically interconnecting the battery modules in series. Edges of each of the battery modules are sealed by means of thermally welding a resin portion of a module main body and a resin case for sealing purpose (hereinafter called a "sealing resin case"), and an outlet used for discharging a hydrogen gas to the outside and terminals are caused to protrude from the case.

A thermowelding apparatus equipped with a heater is used for thermowelding. FIG. 4 shows a perspective external view of a related-art thermowelding apparatus. Further, FIG. 5 shows an enlarged view of the heater shown in FIG. 4.

A thermowelding apparatus 1 has a flat heater 10, a holder 12 for holding this heater 10, and terminal units 14 for heating the heater 10. The heater 10 is spanned between the terminal units 14, and the terminal units 14 are connected to a heat source. The heater 10 is formed from a nichrome wire or the like. When the heater 10 is heated and the thermowelding apparatus 1 is brought into contact with a substance to be thermally welded, such as a battery module, the heater 10 adheres to the surface of the substance, thereby posing difficulty in removal of the heater. In light of the difficulty, the heater 10 is brought into contact with the substance to be thermally welded while ease of peeling is ensured by means of placing a Teflon (Registered Trade Name) tape 16 between the heater and the substance, thereby thermally welding the substance. As shown in FIG. 5, the heater 10 is formed from a heater main body 10a and terminal sections 10b. The flat-plate-shaped heater main body 10a is brought into contact with a plane to be thermally welded, by way of the Teflon tape 16.

2000-169797 A describes a technique intended for preventing infliction of damage to a releasable tape, which would otherwise be caused by a difference between a coefficient of thermal expansion of a plate-like heater and a coefficient of thermal expansion of the releasable tape. To this end, according to the technique, a thermally-adhesive sheet is positioned between a pressure bed, and a plate-like heater located opposite the pressure bed, the plate-like heater being provided with, in a non-contacting manner, a releasable film of a releasable tape made from a material exhibiting releasability. The plate-like heater and the pressure bed are moved mutually in a closing direction, and the thermally-adhesive sheet is subjected to pressurization and heating, thereby sealing the thermally-adhesive sheet.

Moreover, 2006-40694 A describes a configuration intended for providing a hermetic battery which enables easy sealing of a battery housing and in which the battery housing exhibits superior thermal conductivity. As shown in FIG. 6, the hermetic battery has a power-generating element 140 including a positive electrode and a negative electrode; and a battery housing 110 for housing the power-generating element. The battery housing 110 comprises a first housing member 111 which is made of metal and whose inner side surface is exposed within the housing; a second housing member 116 which is made of metal and whose interior surface is exposed within the housing; a first resin member 121 which is made of resin and fixed to the first housing member 111 in a fluid-tight manner; and a second resin member 126 which is made of resin and fixed to the second housing member in a fluid-tight manner. The first resin member 121 and the second resin member 126 are thermally welded together, thereby sealing the battery housing 110.

WO 2006/013743A1 describes the configuration of another battery module and a coating method involving interposition of a sealing member. FIG. 7 shows the configuration of this related-art battery module. A battery module 300 essentially assumes the shape of an rectangular parallelepiped comprising mutually-opposing first and second long side surfaces 300a and 300b, mutually-opposing first and second short side surfaces 300c and 300d, and mutually-opposing first and second end faces 300e and 300f. The battery module 300 comprises a cell group 310 consisting of a plurality of cells 311; a gas duct member 330 for covering respective safety valves of the cell group 310; a positive side cover 340 and a negative side cover 350 for covering the cell group 310 and the gas duct member 330 from both ends thereof along a direction in which the cells are to be aligned in a row; and a sealing member 360 for hermetically sealing the entire module by enveloping the cell group 310 and the gas duct member 330. FIG. 8 shows a sheet-shaped sealing member 461 as an example of the sealing member 360. The sheet-shaped sealing member 461 assumes a rectangular shape consisting of mutually-opposing first and second sides 461a and 461b and mutually-opposing third and fourth sides 461c and 461d. An adhesive is applied, along the first side 461a, to a strip-shaped first side edge section 463 placed on the upper surface of the gas duct member 330. Meanwhile, a second non-adhesive area 465h—which extends from the third side 461c to the fourth side 461d and is not thermal-sprayed with an adhesive—is formed in a strip-shaped second side edge section 465 which is placed on the upper surface of the gas duct member 330 along the second side 461b and which overlaps the first side edge section 463 from the outside. A strip-shaped second adhesive area 466 thermal-sprayed with an adhesive is formed along an area closer to the second side 461b than to the second non-adhesive area 465h in the second side edge section 465. A third non-adhesive area 467h—which extends from the first side 461a to the second side 461b and which is not thermal-sprayed with an adhesive—is formed, along the third side 461c, in a strip-shaped third side edge section 467 which runs around the positive side cover member 340 and is to be fixed thereto. A fourth non-adhesive area 469h—which extends from the first side 461a to the second side 461b and which is not thermal-sprayed with an adhesive—is formed, along the fourth side 461d, in a strip-shaped fourth side edge section 469 which runs around the negative side cover member 350 and is to be fixed thereto. This sheet-shaped sealing member 461 is wrapped around the battery module 300 having not yet been sealed so as to cause the second side edge section 465 to overlap the first side edge section 463. The side edge sections are hermetically fixed into a cylindrical shape by means of welding. Namely, the second non-adhesive area 465h—which is not thermal-sprayed with an adhesive—in the second side edge section 465 is superimposed on the first side edge section 463 from the outside and fixed through welding without interposition of an adhesive. The third side edge section 467 constitutes one opening end section and encloses the positive side cover member 340 and is hermetically fixed to the positive side cover member 340 through welding without interposition of an adhesive. The fourth side edge section 469 constitutes the other opening end section; encloses the negative side cover member 350; and is hermetically fixed to the negative side cover member 350 through welding.

However, under the method for bringing the heater 10 into contact with a surface to be welded by way of the Teflon tape 16, warpage arises in the heater 10 during heating operation. In addition, replacement of the Teflon tape 16 is required at every given period, which entails an increase in cost and deteriorated working efficiency. Moreover, thermowelding is performed by way of the Teflon tape 16, and hence there arises a necessity for increasing the heating temperature of the heater 10, and a thermowelding time is also increased. Furthermore, air accumulates between the Teflon tape 16 and the heater 10, and hence the quality of a surface to be welded is degraded.

SUMMARY

The present invention provides a thermowelding apparatus which enables thermowelding without interposition of a Teflon tape.

Specifically, the present invention provides a thermowelding apparatus for performing thermowelding upon contacting a substance to be thermally welded, comprising:

a heater; and a holder for holding the heater, wherein the heater is a strip-shaped heater whose side surfaces are folded and whose surface is thermal-sprayed with Teflon or fluoroplastics.

The present invention also provides a battery module manufacturing method for a battery module including: a gas duct member for covering safety valves of a cell group formed from a plurality of cells; and first and second side covers for covering the cell group and the gas duct member from one end to the other end in a direction where the cells are arranged, the cell group and the gas duct member being hermetically covered into a cylindrical shape with a sealing member interposed between the first side cover member and the second side cover member, a first opening end section on one side enclosing the first side cover member and being thermally welded thereto, and a second opening end section on a remaining side enclosing the second side cover member and being thermally welded thereto, the method comprising the steps of:

bringing a heater of a thermowelding apparatus into direct contact with an area to be thermally welded; and heating the heater, to thus perform thermowelding, wherein the heater is a strip-shaped heater whose side surfaces are folded and whose surface is thermal-sprayed with Teflon or fluoroplastics.

According to the present invention, releasability is ensured by coating the surface of the heater with Teflon or fluoroplastics, and therefore thermowelding can be performed without interposition of a Teflon tape. Further, folding side surfaces of the heater prevents occurrence of warpage, which would otherwise arise during thermowelding, and enhanced durability is attained.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following figures, wherein.

DETAILED DESCRIPTION

Figure 7:
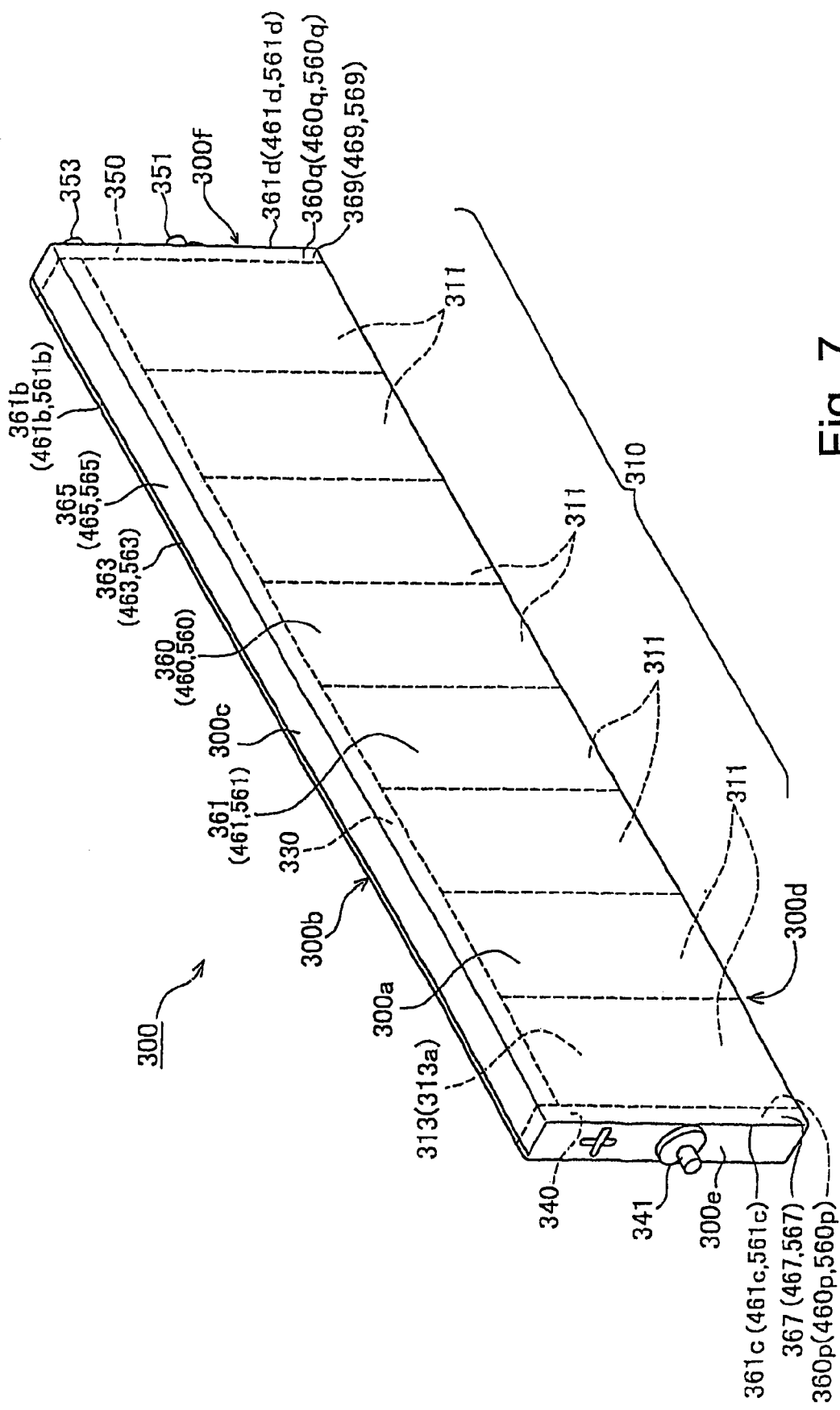
FIG. 7 is a block diagram of another related-art battery module.
Figure 8:
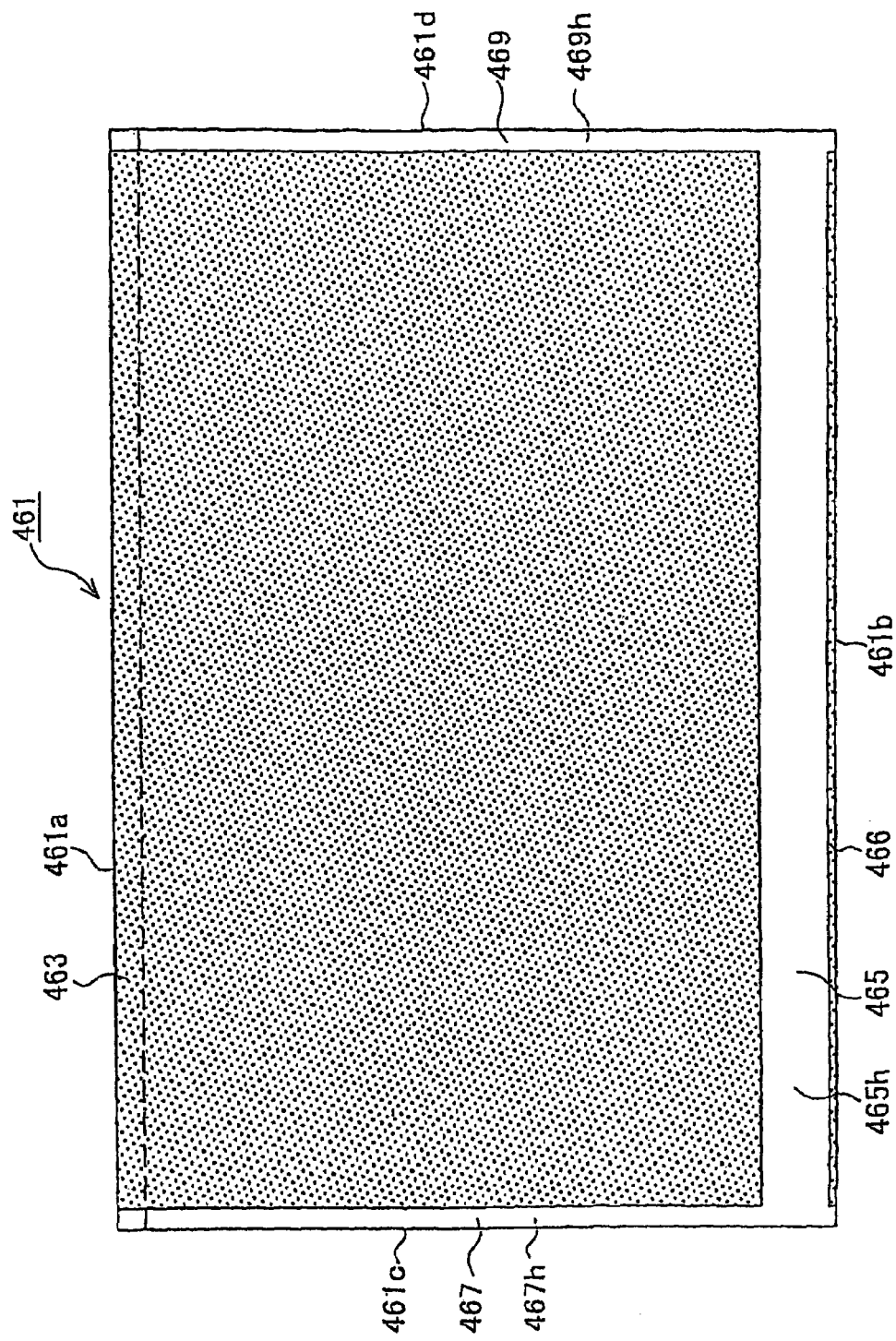
FIG. 8 is a block diagram of a sheet-shaped sealing member.

An embodiment of the present invention will be described hereunder by reference to the drawings by means of taking, as an example, a case where a battery module 300 shown in FIG. 7 is insulation-coated with a sheet-shaped sealing member 461, such as that shown in FIG. 8, through thermowelding.

Figure 1:
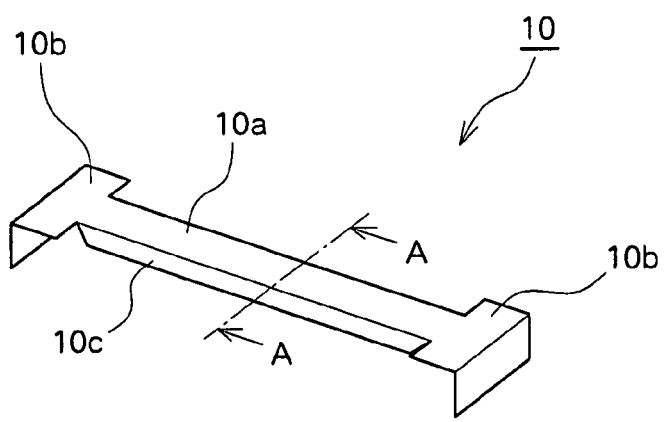
FIG. 1 is a perspective view of a heater according to an embodiment of the present invention.
Figure 2:
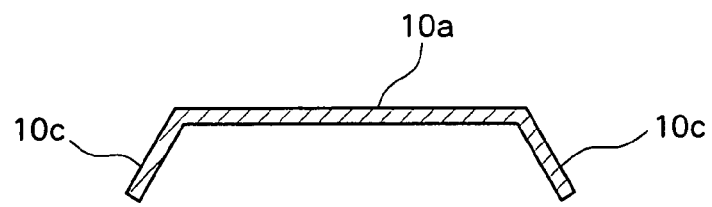
FIG. 2 is a cross-sectional view taken along line A-A shown in FIG. 1.

FIG. 1 shows a perspective view of a heater 10 provided in a thermowelding apparatus of the present embodiment. The heater 10 is built of a nichrome line or the like as in the case of the related art but differs in two points from the related-art heater. Specifically, a first difference lies in that the surface of the heater 10 is subjected to surface treatment including thermal spraying of Teflon, fluoroplastics, or the like; and a second difference lies in that the side surfaces of the heater 10 are folded. The heater 10 comprises a main body 10a and terminal sections 10b, and has a folding section 10c formed by folding both side surfaces of the main body section 10a. FIG. 2 shows a cross section taken along line A-A shown in FIG. 1. A method for forming the heater 10 comprises the following procedures.

(1) Cut a nichrome line to a desired length.

(2) Fold both side surfaces of a main body by means of press-working.

(3) Attach terminal sections 10b to the main body.

(4) Subject the heater to surface treatment including thermal spraying of Teflon or fluoroplastics.

As in the related art, the thermowelding apparatus of the present embodiment comprises the heater 10, a holder 12 for holding the heater 10, and terminal units 14 for heating the heater 10, such as those shown in FIGS. 1 and 2. The heater 10 is spanned between the terminal units 14, and the terminal units 14 are connected to a heat source. The heater 10 is heated, and the thermowelding apparatus 1 is brought into direct contact with a substance to be thermally welded, such as a battery module or the like, thereby thermally welding the substance. Since the surface of the heater 10 is thermal-sprayed with Teflon or fluoroplastics, superior releasability is achieved, and high-quality sealing of a battery module 300 can be hermetically performed without interposition of the Teflon tape 16. Specifically, a sheet-shape sealing member 461 is wrapped around the battery module 300 that has not yet been sealed, thereby causing the second side edge section 465 to overlap the first side edge section 463. The side edge sections are thermally welded into a cylindrical shape by use of a thermowelding apparatus. In the second side edge section 465, the second non-adhesive area 465*h* which is not thermal-sprayed with an adhesive is fixed through thermowelding to the first side edge section 463 in an overlapping manner and from the outside. The third side edge section 467 encloses the positive side cover member 340, and is thermally welded to the positive side cover member 340 by use of the thermowelding apparatus. The fourth side edge section 469 encloses the negative side cover 350 and is thermally welded to the negative side cover member 350 by use of the thermowelding apparatus. Since the Teflon tape 16 is not interposed between the heater and the sealing member, a problem of accumulation of air between the Teflon tape 16 and the heater 10 does not arise. Thanks to enhancement of the quality of a welded surface and shortening of a welding time, high-quality sealing and mass-production of the battery module 300 can be attained.

As shown in FIGS. 1 and 2, warpage, which would otherwise arise during heating, can be prevented by means of folding side surfaces of the heater 10. In the case of a flat heater 10, the main body of the heater 10 is also pulled at the time of release of the sealing member, which deteriorates durability of the heater 10. However, by virtue of the heater 10 being folded, bending stress is increased, and enhanced durability can be attained.

Figure 3:
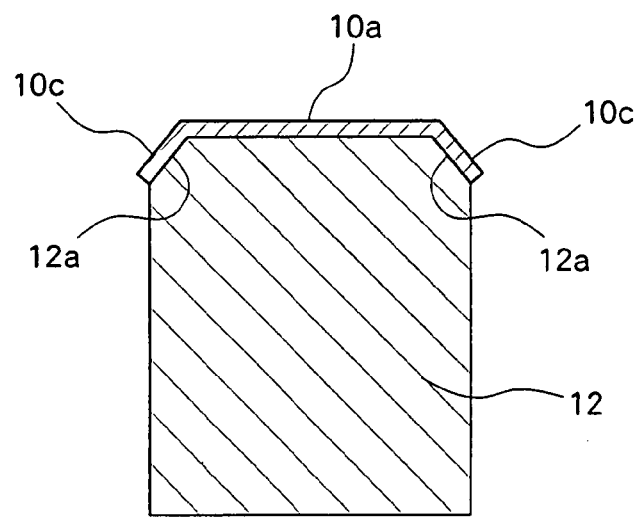
FIG. 3 is a longitudinal cross-sectional view of the heater of FIG. 1.
Figure 4:
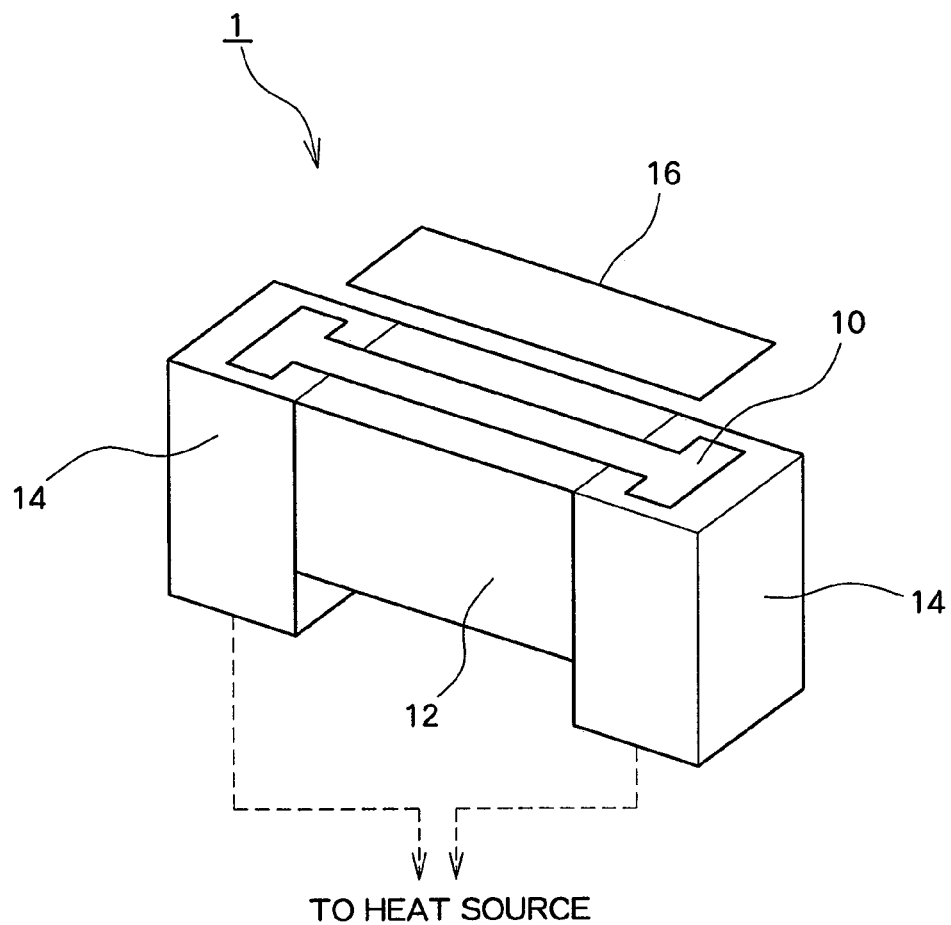
FIG. 4 is a perspective view of a related-art thermowelding apparatus.
Figure 5:
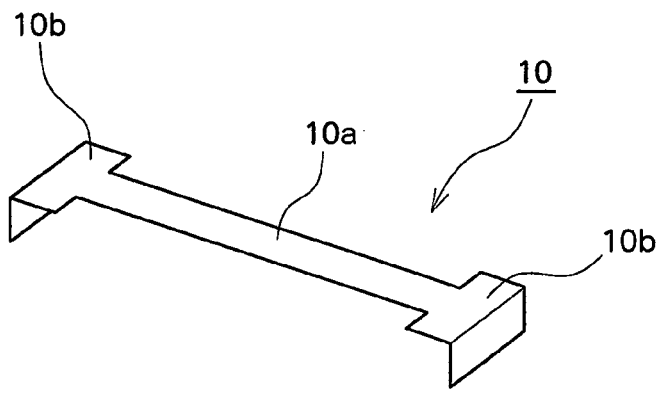
FIG. 5 is an enlarged view of a heater shown in FIG. 4.
Figure 6:
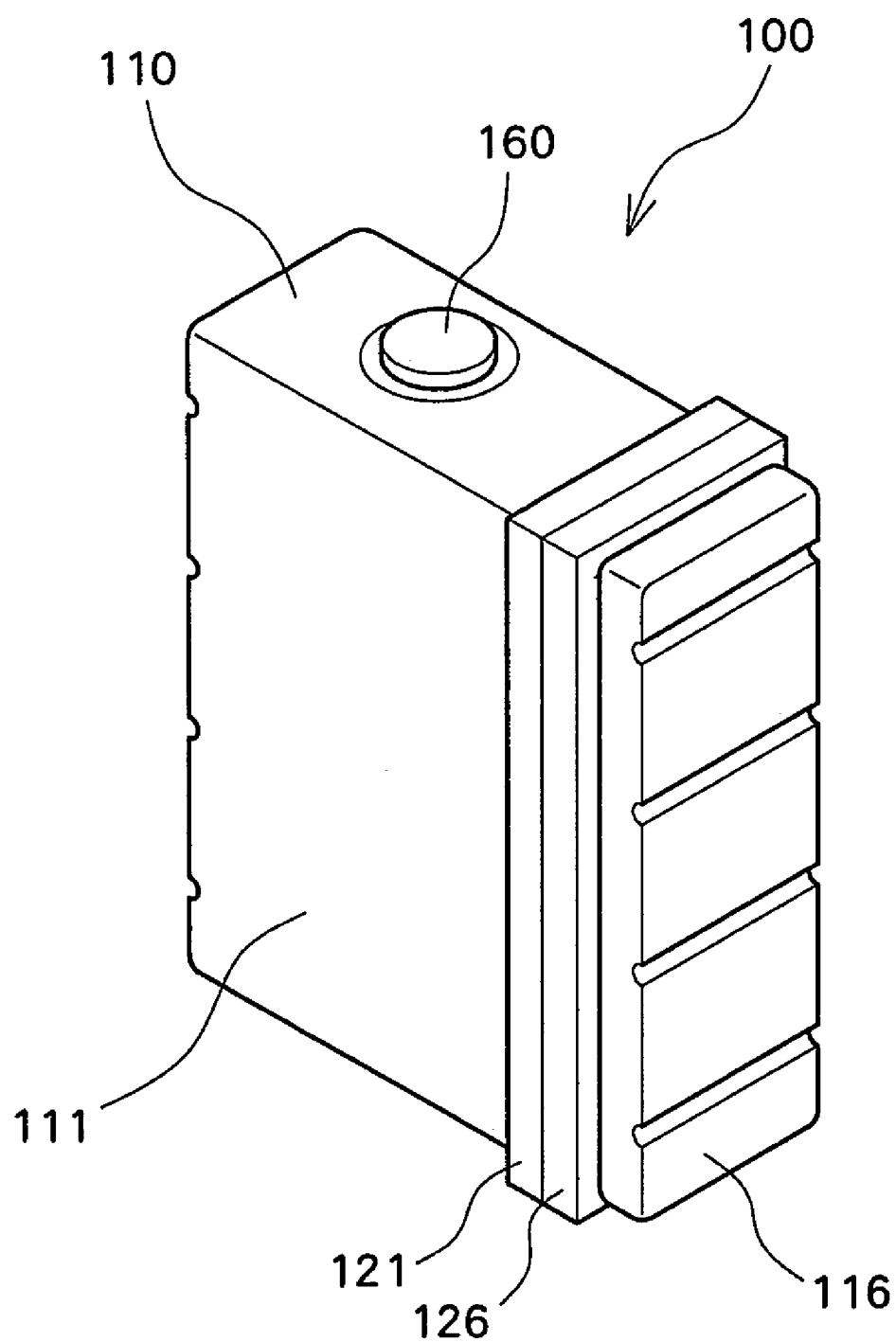
FIG. 6 is a block diagram of a related-art sealed battery.

The holder 12 for holding the heater 10 may also be the related-art holder shown in FIG. 4. However, side surfaces of the main body section 10*a* of the heater 10 are folded, and hence working of the holder into a shape complying with the folded shape of the heater is desirable. FIG. 3 shows a longitudinal cross-sectional view of the thermowelding apparatus 1 of the present embodiment. Tapers 12*a* are formed along upper edge sections of the holder 12 in such a way that the folded sections 10*c* come into contact with the tapers. The folded sections 10*c* of the heater 10 are attached to the holder 12 along the tapers 12*a*. A material of the holder 12 may also be made of metal such as aluminum, iron, or the like, or a non-metallic substance exhibiting superior heat resistance. Furthermore, a clamp may be used when the heater 10 is fixed to the holder 12, as necessary.

What is claimed is:

1. A battery module manufacturing method for a battery module including: a gas duct member for covering safety valves of a cell group formed from a plurality of cells; and first and second side covers for covering the cell group and the gas duct member from one end to the other end in a direction where the cells are arranged, the cell group and the gas duct member being hermetically covered with a sealing member that is formed into a cylindrical shape and that is interposed between the first side cover member and the second side cover member, a first opening end section on one side of the sealing member enclosing the first side cover member and being thermally welded thereto, and a second opening end section on a remaining side of the sealing member enclosing the second side cover member and being thermally welded thereto, the method comprising the steps of:

bringing a heater of a thermowelding apparatus into direct contact with an area to be thermally welded; and heating the heater, to thus perform thermowelding, wherein the heater is a strip-shaped heater having a main elongate surface and two terminal sections provided at opposite sides thereof, the main elongate surface extending substantially the length of the strip-shaped heater between the two terminal sections, the main elongate surface having two elongate side surfaces that extend the length of the main elongate surface between the two terminal sections and that are folded to respectively form an angle with the main elongate surface, and the main elongate surface being thermal-sprayed with polytetrafluoroethylene or fluoroplastics.

* * * * *